United States Patent [19]

Jeanneret

[11] Patent Number: 5,412,305

[45] Date of Patent: May 2, 1995

[54] APPARATUS WITH DISCRETE CIRCUITS FOR CHARGING ELECTRICAL ACCUMULATOR WITH MULTIPLE GROUP OF CELLS

[75] Inventor: René Jeanneret, Merzligen, Switzerland

[73] Assignee: SMH Management Services AG, Biel, Switzerland

[21] Appl. No.: 68,106

[22] Filed: May 28, 1993

[30] Foreign Application Priority Data

Jun. 1, 1992 [FR] France ................. 92 06691

[51] Int. Cl.⁶ ............................................. H02J 7/08
[52] U.S. Cl. ........................................ 320/17; 320/39
[58] Field of Search ................. 320/15, 17, 18, 21, 320/22, 23, 24, 39, 40; 363/71; 323/267, 361

[56] References Cited

U.S. PATENT DOCUMENTS

| | | | |
|---|---|---|---|
| 585,620 | 6/1897 | Cox | 320/17 |
| 3,237,078 | 2/1966 | Mallory | 320/17 |
| 3,305,754 | 2/1967 | Oaks et al. | 320/17 |
| 3,493,837 | 2/1970 | Sparks et al. | |
| 3,505,584 | 4/1970 | Ford et al. | 320/17 |
| 3,555,395 | 1/1971 | Beery | 320/17 |
| 3,623,139 | 11/1971 | Dickerson | 320/17 X |
| 4,079,303 | 3/1978 | Cox | 320/17 |
| 4,084,124 | 4/1978 | Kapustka | 320/15 X |
| 4,238,721 | 12/1980 | DeLuca et al. | 320/18 |
| 4,331,911 | 5/1982 | Park | 320/17 X |
| 4,614,905 | 9/1986 | Petersson et al. | 320/18 |
| 4,809,151 | 2/1989 | Ota | 363/71 X |
| 5,003,244 | 3/1991 | Davis, Jr. | 320/17 |
| 5,153,496 | 10/1992 | LaForge | 320/17 |

FOREIGN PATENT DOCUMENTS

WO92/06525 4/1992 WIPO .

OTHER PUBLICATIONS

8039 Ericsson Review, H. Anderson et al., Sealed Lead-Acid Batteries for Small Telecommunication Plants, 1983, pp. 222-225.

Primary Examiner—Kristine L. Peckman
Attorney, Agent, or Firm—Pollock, Vande Sande & Priddy

[57] ABSTRACT

A charging apparatus comprising discrete charging circuits each for connection to a different group of cells of an accumulator having multiple groups of cells. Each discrete charging circuit comprises a separate transformer the primary winding of which is connected to a source of an a.c. voltage common to all discrete charging circuits. The secondary winding of each transformer is connected to the input of a rectifier whose output is connected to charging terminals for connection to group terminals of a corresponding group of cells. This arrangement enables the accumulator to be completely charged while substantially reducing the risk of damaging the cell or cells of lowermost maximum capacity.

5 Claims, 3 Drawing Sheets

APPARATUS WITH DISCRETE CIRCUITS FOR CHARGING ELECTRICAL ACCUMULATOR WITH MULTIPLE GROUP OF CELLS

TECHNICAL FIELD

The present invention concerns an apparatus for charging a rechargeable electrical energy accumulator comprising a first plurality of cells.

BACKGROUND OF THE INVENTION

In order not to unduly complicate the following description, the terms "charger" and "accumulator" will be used herein to designate respectively such an apparatus and such a rechargeable electrical accumulator.

Moreover, and for the same reason, reference will solely be made to the charging of such an accumulator, even to designate the operation carried out after use of the accumulator for some time for the purpose of restituting the electrical energy supplied thereby, which operation is often termed recharging the accumulator.

In everyday language, the term "capacity" of an accumulator is very often used to designate what is in fact its nominal capacity, i.e. the magnitude, usually expressed in Amp.hours, which represents the quantity of electrical energy that the accumulator may theoretically restitute in given conditions, after having been fully charged. Therefore, in this sense, the capacity of a given accumulator has a fixed value.

It should however be noted that in the following description the term "capacity" will be used to designate the magnitude representing the quantity of electrical energy that an accumulator can restitute at any given instant, whereby the capacity is variable between a maximum value, which may be different from the nominal capacity of the accumulator, and a zero value, namely those values when the accumulator is fully charged and fully discharged.

The charging of an accumulator may be carried out by different methods which are well-known and which will not all be described here.

According to one of these methods, which is very often used, charging is carried out in two distinct consecutive stages.

During the first of these stages, the charger supplies to the accumulator a current Ia having a constant magnitude I1 which is selected in dependence on the nominal capacity on the accumulator and of the maximum admissible time for fully charging it after it has been discharged. Thus, for example, if one assumes that the charging of an accumulator having a nominal capacity of 200 Amp.hours may last ten hours, the selected value of magnitude I1 will be 20 Amps. This magnitude I1 must however in no case exceed a maximum value set by the manufacturer of the accumulator, otherwise there would be a risk of damaging the accumulator.

This first stage during which the voltage Ua across the accumulator's terminals increases regularly, terminates when said voltage Ua reaches a value U1 which is also set by the accumulator manufacturer.

Charging of the accumulator, which is still not complete at the end of this first stage, ends during the second stage, during which the charger maintains the voltage Ua across the accumulator's terminals at said value U1.

The current Ia then drops until it becomes very weak when the capacity of the accumulator has reached the maximum value.

A charger carrying out this method may consist of a source arranged so as to supply a constant current having the above-mentioned magnitude I1 as long as the voltage across its terminals is less than the above-mentioned value U1, and so that this voltage across its terminals does not exceed said value U1.

According to another method, which is also often used, charging of the accumulator is carried out in a single stage, by supplying to the accumulator a current Ia whose magnitude decreases progressively during the increase of the capacity of this accumulator, down to a very low value when the capacity reaches its maximum value, the voltage Ua across the terminals of the accumulator increasing during that time up to the above-mentioned value U1.

A charger carrying out this method may consist of a voltage source arranged to supply a no-load voltage having the value U1 and having an internal resistance such that the magnitude of the maximum current it can supply has the value I1.

It should be noted that the voltage Ua across the terminals of an accumulator should not exceed this value U1, otherwise there is a risk of damaging the accumulator and hence reducing its lifetime. However, this value U1 depends largely on the temperature of the accumulator during charging thereof.

Known chargers therefore often include means for adjusting this value U1 in dependence on the temperature of the accumulator, which means may be simply manual, or may be automatic in which case they of course include one or several temperature-measuring sensors arranged in the accumulator.

In the simplest known chargers, the value U1 is fixed, which means that, depending on the temperature, the accumulator is either not completely charged, or risks being damaged.

It is well-known than the various cells of an accumulator practically never all have the same maximum capacity. In other words, the maximum quantity of electrical energy that each of these cells may store during charging of the accumulator and later reinsure is practically never the same. This is due to the fact that it is practically impossible to manufacture these cells in such manner that the various parameters which determine their maximum capacity, for example the volume and/or the chemical composition of their active material, are rigorously identical from one cell to another. Moreover, some of these parameters may vary over time and/or with temperature.

It is also well-known that it is not desirable to cause a large current to continue to flow through a cell of an accumulator when this cell is fully charged, i.e. when its capacity has reached its maximum value, because this current then produces chemical and/or physical phenomena that may damage the cell. The seriousness of the damage to the cell in such a case increases with the magnitude of the current flowing through it, and this damage in particular results in further reducing its maximum capacity.

Now, when an accumulator is charged by means of a known charger, and whatever charging method is employed with this device, the same current evidently flows through all of the cells of this accumulator. As a result, that cell of the accumulator whose maximum capacity is lowest reaches this maximum capacity at a time when the other cells have still not reached their maximum capacity. As it is in general not possible to determine this time, the charging current of the accumulator continues to flow through the cell having the lowest maximum capacity after the latter has reached this maximum capacity. This cell is thus highly likely to be damaged by this current. As moreover the probable damage to this cell leads in particular to a reduction of its maximum capacity, each time the accumulator is charged again this cell further deteriorates little-by-little and in the end is completely destroyed, which leads to breakdown of the entire accumulator.

These drawbacks are all the more serious when the number of cells of an accumulator is great. Take for example the case of a lead accumulator charged by a charger carrying out the first above-described method.

For such an accumulator, the above-defined value U1 is for example set at 2.5 Volts per cell. If this accumulator includes sixty cells, this value U1 will be $$U1 = 60 \times 2.5 \text{ Volts} = 150 \text{ Volts}$$

Let us also assume that one of the sixty cells, which will be called cell Ex to distinguish it from the fifty-nine other cells, has a maximum capacity less than each of the maximum capacities of these other cells, and that the maximum capacities of the latter are all equal.

During the first stage of charging this accumulator, the voltage across the terminals of cell Ex of course reaches the value 2.5 Volts before the voltage across the terminals of each of the other cells, at an instant designated by t1.

Let us further assume that at this instant t1 the voltage across the terminals of each of the fifty-nine cells other than cell Ex has a value of only, say, 2.3 Volts.

The voltage Ua across the terminals of the accumulator at instant t1 is thus only:

$$Ua = 59 \times 2.3 \text{ Volts} + 2.5 \text{ Volts} = 138.2 \text{ Volts}$$

The charger thus does not interrupt the first stage of charging the accumulator and the magnitude of the current which continues to flow through the cells of the accumulator, including of course cell Ex, remains constant. The voltage across the terminals of each of these cells continues to increase, with the voltage across the terminals of cell Ex stabilizing quite quickly, when the capacity of cell Ex has reached its maximum value, at a value of say 2.7 Volts.

When the voltage Ua across the terminals of the accumulator reaches the above-mentioned value of 150 Volts at an instant designated as instant t2, and the charger interrupts the first charging stage of the accumulator, the voltage across the terminals of each of the fifty-nine cells other than cell Ex is thus equal to $$\frac{150 \text{ Volts} - 2.7 \text{ Volts}}{59} = 2.497 \text{ Volts}$$

It is known that when a lead accumulator is charged by a constant current, as in the present example, the rate of increase of the voltage across the terminals of each of its cells is not constant in relation to time, but decreases as the voltage increases to become quite low when said voltage approaches the value 2.5 Volts. It can thus be understood that a fairly long time is needed between the instant t1, when the voltage across the terminals of all of the accumulator's cells, except for cell Ex, is equal to 2.3 Volts, and the instant t2, when said voltage is almost equal to 2.5 Volts.

There is thus a great risk of cell Ex being damaged by the large current which continues to flow through it for a fairly long time after its capacity has reached its maximum value.

In practice, because the maximum capacities of the accumulator's various cells are not all equal to one another, it is not just one cell which risks being damaged, but all those whose maximum capacity is relatively low and whose voltage reaches 2.5 Volts before the end of the first stage of charging accumulator.

SUMMARY OF THE INVENTION

An object of the present invention is to propose an apparatus for charging an accumulator which substantially reduces the risk of damaging the accumulator during the charging thereof if one or another of its cells has a maximum capacity less than that of the other cells, or which even completely eliminates this risk.

This object is achieved by the claimed apparatus which is an apparatus for charging an electrical energy accumulator comprising a first plurality of cells and which is characterized by the fact that it comprises a second plurality of discrete charging circuits each for charging one group of said cells, each of said groups comprising at least one of said cells.

BRIEF DESCRIPTION OF THE DRAWINGS

Other objects and advantages of the present invention will become apparent from the following description made with reference to the accompanying drawings in which.

DETAILED DESCRIPTION OF THE INVENTION

For a reason which will become apparent from the following description, the cells of the accumulator 2 are divided into n groups of cells, designated by the references 2.1 to 2.n and each having, in the present example, the same number of cells.

Figure 1:
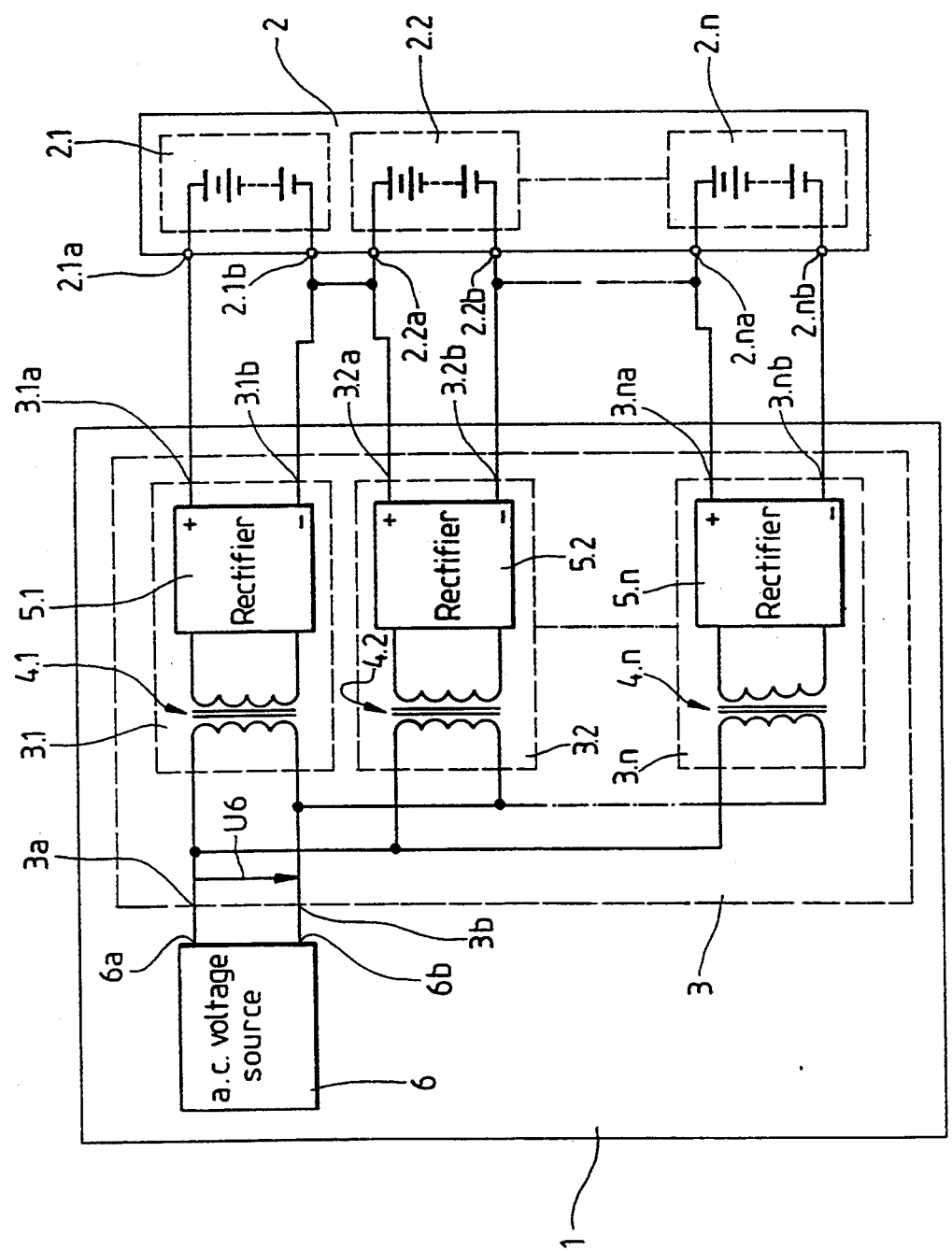
FIG. 1 is a general diagram of the charger according to the invention.

Only the two first, 2.1 and 2.2, and the last, 2.n, of these groups of cells have been shown in FIG. 1.

All the cells of the same group are of course connected in series with one another.

Each group of cells 2.1 to 2.n has a first terminal that is accessible from the exterior of the accumulator 2 and which is connected to the positive terminal of its first cell, and a second terminal that is also accessible from the exterior of the accumulator 2 and which is connected to the negative terminal of its last cell. Each first and each second terminal of course constitutes respectively the positive terminal and the negative terminal of the group to which they belong, and they are designated by the same reference as said group, followed by the letter a and the letter b, respectively.

The positive terminal 2.1a of the first group of cells 2.1 and the negative terminal 2.nb of the last group of cells 2.n of course constitute respectively the positive terminal and the negative terminal of accumulator 2.

The negative terminal of each group of cells, with the exception of course of that of the last group 2.n, is connected to the positive terminal of the following group of cells, so that all of the cells of accumulator 2 are connected in series with one another between the positive terminal 2.1a and the terminal 2.nb of accumulator 2.

The charger 1 comprises a plurality of discrete charging circuits collectively referenced 3 and each intended to charge one of the groups of cells 2.1 to 2.n of accumulator 2. These charging circuits are respectively referenced 3.1 to 3.n, the second digit of the reference of each charging circuit being identical to that of the reference of the group of cells of accumulator 2 it is intended to charge.

Each charging circuit 3.1 to 3.n comprises a transformer and a rectifier circuit connected to the secondary winding of this transformer. These transformers and rectifier circuits are respectively referenced 4.1 to 4.n and 5.1 to 5.n, the second digit of the reference of each of these transformers and of each these rectifiers being identical to that of the reference of the charging circuit of which they form part.

The primary windings of transformers 4.1 to 4.n are all connected in parallel to inputs 3a and 3b that are common to all of the charging circuits 3.1 to 3.n, which inputs are connected to the outputs 6a and 6b of a source 6 producing an a.c. voltage U6.

The rectifier circuits 5.1 to 5.n will not be described in detail as they may be of the same type as any of the numerous rectifier circuits well-known to specialists. It will simply be noted that for certain types of rectifier circuits, it is necessary to provide a center tap at the secondary winding of the transformer to which they are connected. Such a case has not been shown.

The positive output of each rectifier 5.1 to 5.n which is indicated by the sign +constitutes the positive output of the charging circuit of which this rectifier forms part, and this latter output bears the same reference as the charging circuit, followed by the letter a. Likewise, the negative output of each rectifier 5.1 to 5.n, which is indicated by the sign —, constitutes the negative output of the charging circuit of which this rectifier forms part, and this latter output bears the same reference as the charging circuit, followed by the letter b.

As each charging circuit 3.1 to 3.n is intended to charge one of the groups of cells 2.1 to 2.n of accumulator 2 as mentioned above, each of the outputs 3.1a to 3.na and each of the outputs 3.1b to 3.nb of these charging circuits 3.1 to 3.n is of course connected to that terminal of accumulator 2 whose reference has the same second digit and the same letter.

It should be noted that, in certain cases, the groups of cells forming accumulator 2 are connected in series with one another by internal connections. Each of these connections is thus of course connected to a single terminal accessible from the exterior of the accumulator. In other words, the negative terminal of each group of cells, except for the last, and the positive terminal of the following cell, which are separate in the example of FIG. 1, then form only one and the same terminal common to the two groups of cells.

In such a case, which has not been shown, the negative terminal of each charging circuit 3.1 to 3.n, with the exception of that of the last charging circuit, and the positive terminal of the next charging circuit are of course both connected to the terminal of the accumulator which is common to the two groups of cells that these two circuits must charge respectively.

This connection may be provided by two separate conductors, or by a single conductor, the negative terminal of each charging circuit 3.1 to 3.n, with the exception of that of the last one, being then connected to the positive terminal of the following charging circuit inside charger 1.

It must also be noted that the various connections between the charger 1 and accumulator 2 may be fixed when the charger 1 and accumulator 2 are permanently in the proximity of one another, for example in a fixed, non-mobile installation, or when they are both mounted in a vehicle. These various connections may also be removable when, for example, the charger 1 is fixed and is intended to charge accumulators forming part of mobile devices such as, for example, vehicles.

It should also be noted that the a.c. voltage source 6 may be dispensed with, the primaries of the transformers 4.1 to 4.n in this case all being connected, fixedly or in removable manner as appropriate, to a supply of electrical energy, for example to the mains supply. However, because the frequency of the a.c. voltage from such a supply is generally quite low, for example 50 Hz or 60 Hz, the volume of the transformers 4.1 to 4.n must then be quite large. For this reason, it is often advantageous to provide the source 6 in the form of a generator producing an a.c. voltage having a relatively high frequency, of the order of 10 to 20 kHz, or even greater than the latter value. It is known that, for a frequency of this order of magnitude, the volume of a transformer for transmitting a given electric power is smallest and its price is thus lowest. An example of such a source will be described hereinbelow.

The charger 1 of FIG. 1 can be arranged in such a manner as to implement any known method for charging the groups of cells 2.1 to 2.n of accumulator 2.

Thus, for example, for the charger 1 to operate according to the second charging method described above, it suffices to dimension the transformers 4.1 to 4.n and the rectifiers 5.1 to 5.n, as well as, if necessary, the source 6, in such a manner that the no-load voltage supplied by each of the charging circuits 3.1 to 3.n has a value substantially equal to U1/n, where U1 is the above-mentioned value specified by the manufacturer of accumulator 2, and n is the number of groups of cells 2.1 to 2.n, and in such a manner that the maximum current that can be supplied by each of the charging circuits 3.1 to 3.n is equal to the maximum current that it is desired to supply to the accumulator 2 at the beginning of the charging operation, which is selected in dependence on the maximum capacity of accumulator 2 and the allowable time for charging.

When the charger 1 is arranged in this manner, the magnitude of the current absorbed by each of the groups of cells 2.1 to 2.n and the voltage across its terminals have, at the beginning of the charging of accumulator 2, values which depend on the capacity of this group of cells at this moment, this magnitude being all the greater and this voltage being all the lower as this capacity is low. As this capacity increases, the charging current of this group of cells decreases and the voltage across its terminals increases up to the value U1/n, independently of the capacity of the other groups of cells.

Returning to the example of a sixty-cell lead accumulator to be charged by the first above described method, to be able to charge this accumulator by means of a charger, such as the charger 1 of FIG. 1, the sixty cells are divided into ten groups each of six cells. The above-mentioned value U1/n is thus equal to 150 Volts/10 = 15 Volts Let us assume further that, in one of these ten groups, which will be called the group G, one of the six cells, which will be called the cell Ex to distinguish it from the five other cells of group G, has a maximum capacity lower than each of the maximum capacities of these other cells, and that the latter maximum capacities are all equal.

The first stage of charging of group G takes place in a manner analogous to that described in the above example but, in the present example, when the voltage across the terminals of cell Ex reaches the value of 2.5 Volts at an instant which will be called t1, the voltage Ug across the terminals of group G is only Ug=5×2.3 Volts+2.5 Volts=14 Volts Furthermore, when the voltage Ug reaches the above-mentioned value of 15 Volts, at an instant which will be called t2, and the voltage across the terminals of cell Ex has previously reached the value of 2.7 Volts as in the previous example, the voltage across the terminals of each of the five cells other than cell Ex is only $$\frac{15 \text{ Volts} - 2.7 \text{ Volts}}{5} = 2.46 \text{ Volts}$$

As was recalled above, the rate of increase of the voltage across the terminals of a cell is quite high when this voltage is relatively low, and decreases markedly when this voltage approaches 2.5 Volts.

It can therefore be seen that the time separating the instants t1 and t2 in the present example is much shorter than in the above described example where the accumulator is charged by a known charger.

As a result, when an accumulator is charged by a charger according to the invention, the risk of damaging one of its cells having a lower capacity than the others, and the seriousness of any damage to this cell, are much less than if this accumulator were charged by a known charger, which notably increases its lifetime. This advantage of the charger according the invention relative to known chargers is due to the fact that it includes charging circuits which are discrete from one another and are each intended to charge one group of cells of the accumulator.

In instances where it is important that the lifetime of the accumulator should be as great as possible, the charger according to the present invention may be arranged in such a manner that it includes as many charging circuits as there are cells in the accumulator, the above mentioned groups of cells thus of course each comprising only one single cell. Such a case has not been shown. In its embodiment shown in FIG. 2, the charger according to the present invention is referenced 11.

Like the charger 1 of FIG. 1, the charger 11 is intended to charge an accumulator, also referenced 2, whose cells are also divided into n groups. Although these groups of cells have not been separately shown in FIG. 2, they will be hereinafter designated by the same references as in FIG. 1, namely 2.1 to 2.n.

As will be apparent from the remainder of this description, the accumulator 2 is not necessarily permanently connected to the charger 11.

Like the charger 1 of FIG. 1, the charger 11 comprises discrete charging circuits each intended to charge one of the groups of cells of accumulator 2. These charging circuits, which are designated by the same references 3.1 to 3.n as those of the charger 1 of FIG. 1, may be identical to the latter and will thus not be described again. The same applies to their connections with the terminals of the various groups of cells of accumulator 2.

The charger 11 comprises two input terminals 11a and 11b intended to be connected to a supply network of electrical energy, for example the mains supply, supplying an a.c. voltage, and a rectifier 12 having two inputs 12a and 12b connected respectively to these terminals 11a and 11b. In this example, the supply to which the rectifier 12 may be connected via the terminals 11a and t1b is a monophase supply to which the rectifier 12 is made to correspond. But it is clear that this supply could be a multiphase supply, for example three-phase, in which case the rectifier 12 is correspondingly arranged and the number of input terminals of the charger 11 is adapted to the number of conductors of this supply.

The rectifier 12 will not be described in detail, as it may be similar to any of the numerous rectifiers well-known to specialists. It should simply be noted that it supplies between its positive output 12c and its negative output 12d a rectified voltage U12 whose ripple factor depends on its structure and on the possible presence of a low-pass filter.

The outputs 12c and 12d of rectifier 12 are connected to the inputs 13a and 13b of a voltage regulator 13. This regulator 13 is arranged in such a manner as to produce between its outputs 13c and 13d, from the voltage applied across its inputs 13a and 13b, a stabilized d.c. voltage U13 the value of which depends on the value of a regulation signal it receives on a control input 13e. This regulation signal will be described below.

The outputs 13c and 13d of regulator 13 are connected to the inputs 14a and 14b of a converter 14 which is arranged in a manner to supply at its outputs 14c and 14d an a.c. voltage U14 the value of which depends directly on that of the voltage U13.

The inputs of all of the charging circuits 3.1 to 3.n are connected in parallel to the outputs 14c and 14d of converter 14. Converter 14 further comprises an output 14e, and is arranged in a manner to produce at this output 14e a measurement signal S14 representative of the magnitude of the current I14 it supplies to the charging circuits 3.1 to 3.n.

The charger 11 also comprises an integrator 15 having two inputs 15a and 15b connected respectively to the output 14e of converter 14 and to the output of a source, not shown, supplying a reference signal R1 whose value and purpose will be described below.

The integrator 15 also comprises an output 15c, and is arranged in a manner to supply at this output 15c a signal S15 having a value equal to the integral in dependence of time of the difference between the signals R1 and S14. In other words, the value of signal S15 is given by the equation $$S15 = \int (R1 - S14) dt$$

The charger 11 also comprises a comparator 16 having inputs 16a1 to 16an respectively connected to the positive outputs 3.1a to 3.1n of the charging circuits 3.1 to 3.n and thus to the positive terminals 2.1a to 2.na of the groups of cells 2.1 to 2.n of the accumulator 2 when the latter is connected to the charger 11. The comparator 16 further comprises an input 16ao connected to the negative output 3.nb of the charging circuit 3.n and thus to the negative terminal 2.nb of the last group of cells 2.n of accumulator 2, still while the latter is connected to the charger 11. This comparator 16 further comprises an input 16b receiving from a source, not shown, a reference voltage Ur whose value and purpose will be described below.

The comparator 16 further comprises an output 16c, and is arranged in such a manner that the signal S16 supplied by this output 16c has a first state as long as all of the voltage differences between two of its adjacent inputs 16i1 to 16ao are less than the voltage Ur, and in such a manner that the signal S16 has a second state if any one of these voltage differences is greater than voltage Ur.

In other words, the comparator 16 is arranged in such manner that when the accumulator 2 is connected to the charger 11, the signal S16 has its first state as long as the voltage across the terminals of each of the groups of cells 2.1 to 2.n of this accumulator 2 is less than the voltage Ur, and that the signal S16 has its second state if the voltage across the terminals of any one of these groups of cells 2.1 to 2.n is greater than voltage Ur.

The charger 11 also comprises a switch 17 having a first input 17a and a second input 17b connected respectively to the output 15c of the integrator 15 and to a source, not shown, supplying a reference signal R2 whose value and purpose will be described below.

The switch 17 further comprises a control input 17c which is connected to the output 16c of comparator 16, and an output 17d connected to the control input 13e of the regulator 13. Switch 17 is arranged in such manner that the signal S17 it produces at its output 17c, which is the signal for regulating the value of the above-mentioned voltage U13, is identical to signal S15 or to signal R2, depending upon whether signal S16 is in its first or in its second state.

The just-described circuits 12 to 17 in combination perform the function of the source 6 of charger 1 of FIG. 1 and, as will be described in detail below, this source is arranged in such a manner that the charger 11 charges accumulator 2 by performing a method very similar to the afore-mentioned first method.

In the first of the stages of this method, the charger 11 supplies to the various groups of cells 2.1 to 2.n of accumulator 2, currents which will hereinafter be called respectively currents Ia1 to Ian, all having a substantially constant value equal to the above-mentioned value I1 and selected in the same manner as if this accumulator 2 were to be charged by means of a known charger. In this first stage, the voltages across the terminals of the various groups of cells 2.1 to 2.n, which will be respectively called voltages Ug1 to Ugn, progressively increase independently of one another as the capacity of these groups of cells 2.1 to 2.n increases.

This first stage terminates when any one of these voltages Ug1 to Ugn becomes greater than a predetermined value equal to U1/n, that is to say greater than the ratio of the above-defined value U1 divided by the number n of cells of accumulator 2.

During the second stage of charging of accumulator 2, which begins at the same time, the charger 11 applies to each of the groups of cells 2.1 to 2.n a substantially constant voltage equal to this value U1/n.

It can be seen that the charger 11 also enables all of the groups of cells of accumulator 2 to be charged up to their maximum capacity without risk of damage to one or several cells having a maximum capacity lower than that of the other cells.

When the charger 11 operates and, during the first stage of charging of accumulator 2, must supply to each of the groups of cells 2.1 to 2.n a current having a substantially constant magnitude equal to the above-mentioned value I1, the converter 14 must of course supply a current I14 having a constant magnitude equal to k1.n.I1, where n is the number of groups of cells 2.1 to 2.n and k1 is a constant factor which depends on the characteristics of the transformer and of the rectifier of each of charging circuits 3.1 to 3.n.

For a reason which will become apparent later in the description, the signal R1 applied to input 15b of integrator 15 is selected in such a manner that its value is equal to that taken by the signal S14 when current I14 has the above-mentioned value k1.n.I1.

During the second stage of charging of accumulator 2, the voltages Ug1 to Ugn must all be maintained at a substantially constant value equal to U1/n. The voltage U14 supplied by converter 14 must then of course have a value equal to k2.U1/n, where k2 is another constant factor which also depends on the characteristics of the transformer and of the rectifier of each of the charging circuits 3.1 to 3.n.

For the voltage U14 to have this value, it is of course necessary for the voltage U13 supplied by voltage regulator 13 to have a value equal to k3.U14, where k3 is another constant factor which depends on the characteristics of the converter 14, and for the signal S17 thus also to have a constant and well determined value.

For a reason which will become apparent later in this description, the signal R2 applied to input 17b of switch 17 is selected in such a manner that its value is equal to the value the signal S17 must have for voltages U13 and U14 to have the above-mentioned values, and for the voltage applied to each of the groups of cells 2.1 to 2.2 to thus have the value U1/n.

Still for a reason which will become evident later in this description, the value of the reference voltage Ur applied to input 16b of comparator 16 is equal to this same value U1/n.

When all of the voltages Ug1 to Ugn are less than the voltage Ur, signal S16 is in its first state, and the switch 17 is thus in the state where signal S17 is identical to signal S15.

The voltage U13 produced by regulator 13 from the rectified voltage U12 supplied by rectifier 12 thus has a value which depends on the value of signal S15.

In these conditions, the value of current I14 is automatically adjusted to the above-mentioned value k1.n.I1.

As a matter of fact, if the value of current I14 is equal to k1.n.I1, the signal S14 is equal to signal R1 as mentioned above. Signal S15, which is equal to the integral in dependence of time of the difference of these signals R1 and S14, is thus constant, as is signal S17. The voltages U13 and U14 are thus also constant, and the latter actually has the value for which current I14 is equal to k1.n.I1.

If now the value of current I14 decreases below this value, for example resulting from an increase in the internal resistance of one or several of the groups of cells 2.1 to 2.n of accumulator 2, the signal S14 also decreases, and the difference between signal R1 and signal S14 becomes positive. Signal S15 thus increases, which also results in an increase in voltage U13 and, consequently, in voltage U14, until voltage U14 reaches the value for which the magnitude of current I14 again becomes equal to the value k1.n.I1. At this instant, the difference between signals R1 and S14 becomes zero again, and signal S15 is again constant, as are voltages U13 and U14, the latter then actually having the value for which the magnitude of current I14 has again this value k1.n.I1.

An analogous regulation of the magnitude of current I14 of course occurs if, for any reason whatsoever, this magnitude becomes greater than said value k1.n.I1.

The magnitudes of the currents supplied by the charger 11 to the various groups of cells 2.1 to 2.n during this first charging stage of accumulator 2 are not all exactly equal to the value I1, especially at the beginning of this charging, because they of course depend on the internal resistances of these groups of cells 2.1 to 2.n, which may be different from one another. Only the sum of these magnitudes is constant and equal to n.I1.

But these magnitudes tend to approach this value I1, because the groups of cells having the lowest internal resistances absorb more current and are charged faster than the others.

Their internal resistance thus also increases more rapidly and, after some time, the internal resistances of all of the groups of cells have practically the same value, and the currents absorbed by these groups of cells all substantially take the value I1.

This situation remains unchanged until one of the voltages Ug1 to Ugn at the terminals of the groups of cells 2.1 to 2.n becomes greater than the above-defined value Ur.

At this instant, which marks the end of the first charging stage and the beginning of the second charging stage of accumulator 2, signal S16 takes its second state, and switch 17 takes the state in which its output signal S17 is identical to the above defined signal R2. The voltages U13 and U14 thus become constant, the latter taking the value k2.U1/n, and the voltages Ug1 to Ugn at the terminals of all of the groups of cells 2.1 to 2.n become substantially equal to the value U1/n.

These voltages Ug1 to Ugn are not exactly equal to the value U1/n, once again because of the differences between the internal resistances of these groups of cells 2.1 to 2.n, and as a result the currents absorbed by the latter are different from one another and lead to different voltage drops in the various charging circuits 3.1 to 3.n.

But these differences are small and tend to reduce to zero because, once again, the groups of cells having the lowest internal resistances absorb more current than the others and are charged more rapidly than the latters. Their internal resistance thus increases more rapidly than that of these other cells. After some time, all of these internal resistances become substantially equal to one another, as do the currents absorbed by the various groups of cells, and thus likewise the various voltages Ug1 to Ugn.

During this second stage of charging of accumulator 2, the currents supplied by charger 11 to the various groups of cells 2.1 to 2.n progressively diminish, independently of one another, until they become very weak when these groups of cells are fully charged.

The current I14 supplied by converter 14 then also becomes very weak, as of course does the signal S14.

Figure 2:
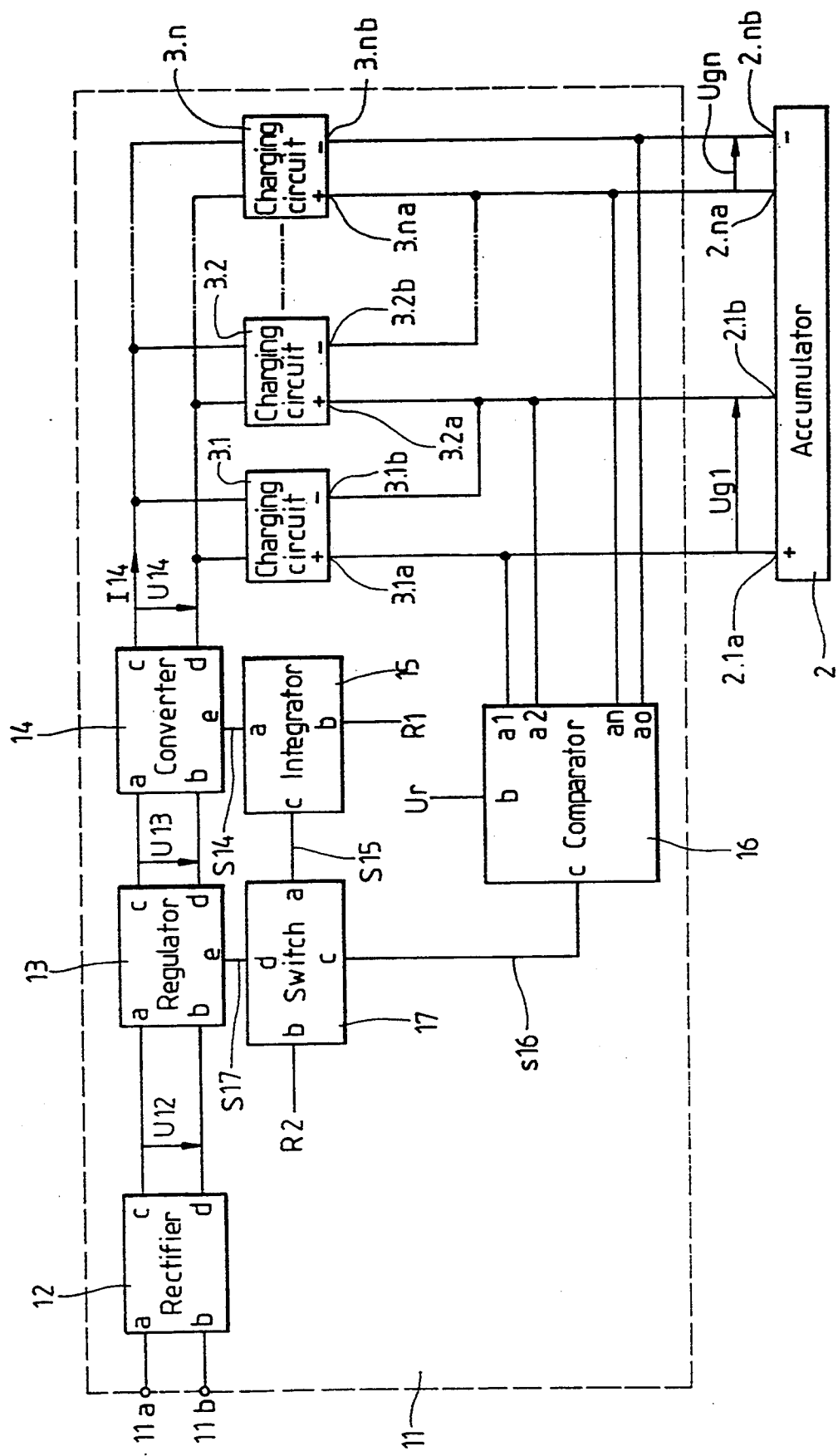
FIGS. 2 and 3 are more detailed diagrams of two embodiments of the charger according to the invention. The charger according to the invention shown schematically and by way of non-limiting example in FIG. 1 and referenced 1 is intended for the charging of an accumulator also shown in FIG. 1 and referenced 2.

A noteworthy advantage resulting from the fact that the source common to all of the charging circuits 3.1 to 3.n includes, as has been described, a rectifier 12, a regulator 13 and a converter 14, is that the frequency of the voltage supplied by this source, i.e. voltage U14 in the example of FIG. 2, is independent of the frequency of the voltage of the electrical energy supply network to which the charger is connected.

The frequency of voltage U14 may thus be freely chosen, and notably at the value for which the volume, and hence the price, of the transformers of charging circuits 3.1 to 3.n is lowest.

This same fact furthermore enables converter 14 to be designed in such a manner that the voltage U14 is not sinusoidal but has a substantially rectangular, or at least substantially trapezoidal, shape.

It is known that when such a voltage is applied to a circuit similar to charging circuits 3.1 to 3.n, the current absorbed by this circuit has substantially the same shape and does not have the very high and rather short peaks that it would have if such voltage were sinusoidal. This property also enables the dimensions, and hence the price, of the rectifiers forming part of the charging circuits 3.1 to 3.n to be reduced.

On another hand, this same fact also enables the voltage regulator 13 to be designed in a such a manner that the alternating current supplied to charger 11 by the electrical energy supply network has a substantially sinusoidal form, which eliminates, or at least substantially reduces, disturbances which otherwise would be produced in the network by this charger.

The various circuits forming charger 11 will not be described in greater detail because they are well-known circuits that can be constructed without any particular problem for specialists.

It is well-known that it is also not desirable to discharge an accumulator below a given limit depending on the type of accumulator, at a risk also of damaging it and reducing its lifetime.

Now, as already mentioned, the various cells of an accumulator never all have the same maximum capacity. As a result, while one accumulator discharges by supplying electrical energy to a user device, the residual capacities of its various cells are never all the same, and necessarily one of these cells always reaches the above mentioned limit, below which it should not be discharged, before the others. To avoid damaging this cell, the discharge of the accumulator should be interrupted at this instant.

But, on the one hand, it is difficult or even impossible to detect this instant when the residual capacity of one cell has reached its limit value. On the other hand, if the discharge of the accumulator is interrupted at this instant, the residual capacity of the other cells has not yet reached the limit value. A non-negligible part of the electrical energy stored in the accumulator could thus not be used, which is not rational.

As will be described below with reference to FIG. 3, one of the embodiments of the charger according to the present invention enables this disadvantage to be avoided by maintaining the capacities of all of the cells of the accumulator at substantially equal values to one another during the use of the accumulator. All of the electrical energy available in this accumulator may thus be used, without a risk that the capacity of one of its cells reaches the limit value below which this cell risks being damaged, before the other cells.

Figure 3:
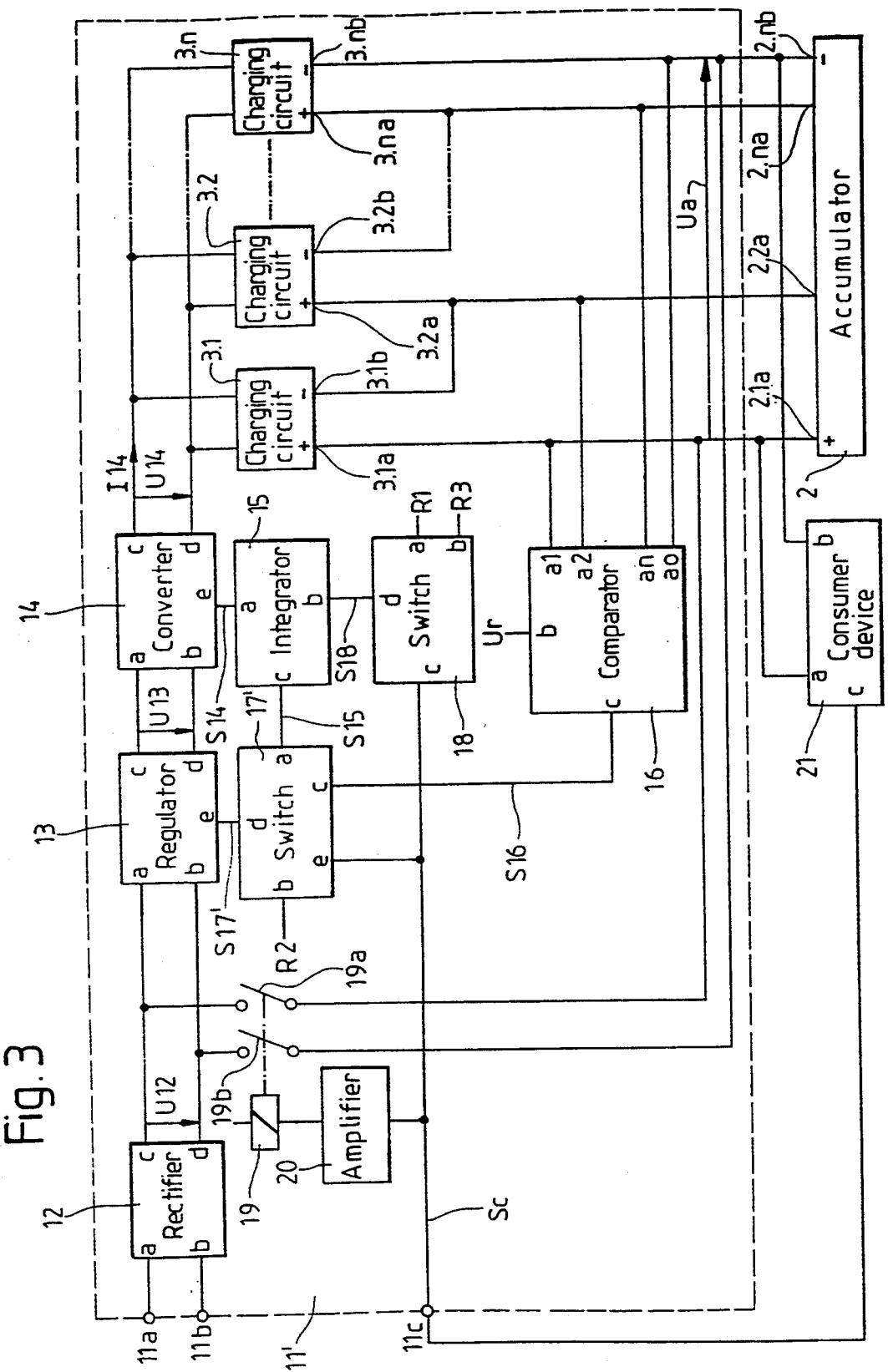

In its embodiment shown in FIG. 3, the charger according to the present invention is referenced 11'.

Like chargers 1 and 11 of FIGS. 1 and 2, the charger 11' is intended to charge an accumulator, also referenced 2, whose cells are divided into n groups which have not been shown separately but which however will be designated by the same references 2.1 to 2.n as in FIG. 1.

Again, as for chargers 1 and 11, the charger 11' includes discrete charging circuits, also referenced 3.1 to 3.n, which are each connected to one of the groups of cells 2.1 to 2.n.

The charger 11' also includes a rectifier 12, a regulator 13, a converter 14, an integrator 15 and a comparator 16 which are identical to the circuits designated by the same references in FIG. 2 and which will not be described again here.

Instead of switch 17 of charger 11, the charger 11' has another switch, referenced 17', which also has two inputs 17'a and 17'b connected respectively to the output 15c of integrator 15 and to the output of the source, also not shown, supplying signal R2, and an output 17'd connected to the control input 13e of regulator 13 and supplying to the latter the control signal of voltage U13, which is referenced here S17'.

The switch 17' further comprises two control inputs 17'c and 17'e connected respectively to the output 16c of comparator 16 and to an additional input terminal 11c of charger 11', this terminal 11c being intended to receive, in a manner that will be described below, a signal Sc which can take a first or a second state.

The switch 17' is arranged in a manner to produce signal S17' in the following manner:

when signals S16 and Sc are both in their first state, signal S17' is identical to signal S15;

when signal Sc is in its first state and signal S16 is in its second state, signal S17' is identical to reference signal R2;

when signal Sc is in its second state, signal S17' is identical to the signal S15, independently of the state of signal S16.

The charger 11' also includes a switch 18 having two inputs 18a and 18b connected respectively to sources, not shown, namely a first source supplying a reference signal identical to the above-described signal R1 and designated by the same reference, and a second source supplying another reference signal, designated by R3, whose value, for a reason which will become apparent from the description below is equal to the value of signal R1 divided by a fixed and predetermined factor f.

The switch 18 further includes a control input 18c connected to the input terminal 11c of charger 11', and is arranged in a manner to supply at its output 18d a signal S18 identical to signal R1 or to signal R3 depending on whether the signal Sc applied to said terminal 11c in a manner which will be described below is in its first state or its second state.

The charger 11' also includes an electromagnetic relay 19 having two contacts 19a and 19b. Contact 19a is connected in series between the positive terminal 2.1a of accumulator 2 and the positive output 12c of rectifier 12, which is itself connected to the input 13a of voltage regulator 13, and contact 19b is connected in series between the negative terminal 2.nb of accumulator 2 and the negative terminal 12d of rectifier 12, which is itself connected to the input 13b of voltage regulator 13.

The coil of relay 19 is connected to the output of an amplifier 20 whose input is connected to the input terminal 11c of charger 11, and which is arranged in a manner such that the contacts 19a and 19b of relay 19 are open, as shown, or closed according to whether signal Sc is in its first or its second state.

The device supplied by the accumulator 1 has also been schematically shown in FIG. 3 and referenced 21.

This device 21 may be any one of numerous devices that can be supplied by an accumulator like accumulator 2. By way of non-limiting example, such a device may be constituted by one or several electric motors associated with a suitable control circuit and driving one or more driving wheels of an automobile vehicle.

Whatever may be its nature, the device 21 of course comprises two supply terminals 21a and 21b connected respectively to the positive terminal 2.1a and to the negative terminal 2.nb of accumulator 2, as well as means, not shown, enabling it to be put into or out of service.

The above-mentioned signal Sc is supplied by an output 21c of device 21 which is connected to input 11c of charger 11', and this device 21 is arranged in such a manner that, according to whether it is out of service or in service, the signal Sc is respectively in its first state and in its second state.

As will be described in detail below, the charger 11' may function in two different modes.

The first of these modes is used when the device 21 is out of service and the terminals 11a and 11b of charger 11' are connected to an electrical energy supply network.

The signal Sc is thus in its first state, so that signal S18 is identical to the reference signal R1, the signal S17' is identical to signal S16, and the contacts 19a and 19b of relay 19 are open.

Operation of the charger 11' is thus identical to that of the charger 11 of FIG. 2, and will not be described again in detail here.

The second mode of operation of charger 11' is used when its terminals 11a and 11b are not connected to an electrical energy supply network, and the device 21 is in service. The accumulator 2 then supplies a given current to the device 21, and the capacity of its various groups of cells decreases.

The signal Sc is then in its second state, and as a consequence the contacts 19a and 19b of relay 19 are both closed, and the voltage Ua between the positive terminal 2.1a and the negative terminal 2.nb of accumulator 2 is now applied to the inputs 13a and 13b of voltage regulator 13.

Moreover, switch 17' is in the state where its output signal S17' is identical to signal S15. As switch 18 is now in the state where its output signal S18 is identical to reference signal R3, signal S15 is now equal to the integral in dependance of time of the difference between signal R3 and signal S14.

Operation of the charger 11' in this second mode is analogous to that of charger 11 of accumulator 2 of FIG. 2, as described above.

But, in this second mode, regulator 13 produces voltage U13 from the voltage Ua across the terminals of accumulator 2.

Also, the value of signal S17', on which depends the value of voltage U13, the value of voltage U14 and the magnitude of current I14, is now equal to the integral in dependence of time of the difference between the values of signals R3 and S14. As the value of signal R3 is equal to the value of signal R1 divided by the above-mentioned factor f, the magnitude of current I14 is now regulated to a value which is equal to k1.n.I1/f, k1.n.I1 being the value of the magnitude of current I14 during the first charging stage of accumulator 2 when the charger operates in its first mode.

Each of the charging circuits 3.1 to 3.n thus supplies to the group of cells 2.1 to 2.n connected therewith a current, which will be called the compensation current, flowing in this group of cells in a direction opposite to the current supplied by accumulator 2 to device 21, and thus resulting in a reduction of the rate of decrease of the capacity of the group of cells 2.1 to 2.n it flows through, this decrease being of course due to the fact that accumulator 2 supplies the electrical energy required for operation of device 21.

The sum of the magnitudes of these compensation currents is of course equal to n.I1/f, but these magnitudes may be different from one another because the capacities of the groups of cells 2.1 to 2.n, and hence their internal resistances, may also be different from one group of cells to another.

These differences however tend to attenuate progressively as accumulator 2 discharges, due to the fact that the compensation currents having the greatest magnitude are actually those which flow through the groups of cells having the lowest internal resistances, and hence the lowest capacities.

The rate of decrease of the capacity of these groups of cells thus diminishes more strongly than that of the other groups of cells so that, after some time, the capacities of all of the groups of cells becomes substantially equal, as do the rates of decrease of these capacities. The magnitudes of the various compensation currents then also become substantially equal to one another, and hence each equal to the value I1/f.

The value of factor f may be selected very freely. Tests have demonstrated that good results are obtained when the compensation current has a magnitude comprised between 1/50th and 1/5th of the magnitude of the current the accumulator can theoretically supply during one hour. Hence, for example, for an accumulator having a nominal capacity of 200 Amp.hours, the magnitude of the compensation current may be comprised between 1/50th and 1/5th of 200 Amps, namely between 4 Amps and 40 Amps.

As mentioned above, the magnitude I1 of the current supplied to the accumulator during the first stage of charging thereof is selected in such a manner that it is equal to the ratio between the nominal capacity of the accumulator, expressed in Amp.hours, and the allowable time for charging it, expressed in hours.

As a result, for the compensation current to have the afore-mentioned magnitude, the factor f must be comprised between 1/50th and 1/5th of the number of hours of this allowable time.

Thus, in the above case of an accumulator having a nominal capacity of 200 Amp.hours, if the allowable time for charging the accumulator is ten hours, in which case the magnitude I1 is selected at 20 amperes, the value of factor f may be comprised between 1/50th and 1/5th of ten, namely between 0.2 and 2, which effectively results for the compensation current in a magnitude comprised between 4 Amps and 40 Amps.

It can be seen that when charger 11' operates in this second mode, it takes off a part of the energy stored in accumulator 2 and restitutes it to the various groups of cells 2.1 to 2.n, distributing it between the latter in such a manner that their capacities tend to become equal to one another, as well as the rates of decrease of these capacities.

This results in a very great reduction of the risk that the capacity of one of the groups of cells 2.1 to 2.n reaches the minimum value below which this group of cells should not be discharged under the penalty of being damaged, well before that of the other groups of cells. It is thus possible to use practically all of the electrical energy available in the accumulator 2 without risk of damaging it.

Numerous modifications may be made to the charger according to the present invention without however departing from the scope of the invention.

Among these modifications, which of course cannot all be described here, will simply be mentioned that which consists of providing one or several temperature-measuring sensors for the accumulator 2, and means responding to this measurement to modify the value of voltage Ur and the value of signal R2 in dependence of the temperature in such a manner that whatever the temperature may be, the accumulator 2 may be charged up to its maximum capacity without however incurring any risk of being damaged.

Mention will also be made of the modification which consists of providing the charger according the invention with means arranged in a manner to interrupt its operation when, at the end of charging of the accumulator, the magnitude of the current supplied by source 6 (FIG. 1) or by the converter 14 (FIGS. 2 and 3) becomes less than a predetermined value.

A vehicle whose driving wheel or wheels is or are driven by one or several electric motors supplied by an accumulator, which is thus called a driving accumulator, generally has another accumulator, called the auxiliary accumulator, which is intended to supply all of the auxiliary circuits of this vehicle, such as its headlights, braking lights, its dashboard instruments, etc. This vehicle also comprises a charger for this auxiliary accumulator.

Of course, when such a vehicle is equipped with a charger according to the present invention to charge its driving accumulator, it is advantageous to provide a transformer at the input of the charger of its auxiliary accumulator, and to connect the primary winding of this transformer to the source, such as source 6 of FIG. 1, in parallel with the primary windings of the transformers forming part of the charging circuits such as circuits 3.1 to 3.n of FIG. 1.

What is claimed is:

1. An apparatus for charging a rechargeable electrical energy accumulator for producing a first d.c. voltage, said accumulator having cells arranged in multiple groups of cells each group comprising at least one cell, and each group of said multiple groups of cells having group terminals and providing a second d.c. voltage across said group terminals, said apparatus comprising a source for producing a first a.c. voltage and a plurality of discrete charging circuits each for charging a corresponding group of said multiple groups of cells, each of said charging circuits having charging terminals for connection to corresponding group terminals of said corresponding group of said multiple groups of cells, one of said group terminals being a positive terminal of said accumulator and another of said group terminals being a negative terminal of said accumulator, group terminals other than said positive and negative accumulator terminals being connected such that all of the cells of said accumulator are connected in series with one another between said positive and negative accumulator terminals, and each of said charging circuits comprising a respective transformer having a primary winding connected to said source and a secondary winding, and a rectifier having inputs connected to said secondary winding and outputs connected to said charging terminals, the primary windings of the respective transformers of said charging circuits being independent of each other.

2. An apparatus according to claim 1, wherein said source comprises means for supplying to said charging circuits, when all said charging terminals are respectively connected to said corresponding group terminals, a current having a magnitude which is substantially equal to a constant magnitude when said second d.c. voltage across the group terminals of each group of said multiple groups of cells is less than a predetermined reference voltage, and a voltage having a substantially constant value when said second d.c. voltage across the group terminals of any group of said multiple groups of cells is greater than said reference voltage.

3. An apparatus according to claim 2, wherein said source comprises:
rectifier means for supplying a rectified voltage from a second a.c. voltage;
regulator means for supplying, from said rectified voltage, a third d.c. voltage having a value depending on a value of a regulation signal;
converter means for supplying said first a.c. voltage from said third d.c. voltage and for supplying a measuring signal having a value depending on said magnitude of said current;
means for supplying an integration signal having a value equal to an integral in dependence of time of the difference between a value of a first reference signal and said value of said measuring signal, said value of said first reference signal being equal to said value of said measuring signal when said magnitude of said current is substantially equal to said constant magnitude; and
means for producing said regulation signal with a value equal to said value of said integration signal when said second d.c. voltage across the group terminals of each group of said multiple groups of cells is less than said reference voltage, and with a value equal to a value of a second reference signal when said second d.c. voltage across the group terminals of any group of said multiple groups of cells is greater than said reference voltage.

4. An apparatus according to claim 2, wherein said source comprises:
rectifier means having outputs and responsive to a second a.c. voltage for supplying a rectified voltage between said outputs of said rectifier means;
regulator means having inputs connected to said outputs of said rectifier means and responsive to a regulation signal for supplying a third d.c. voltage having a value depending on the value of said regulation signal;
converter means for supplying said first a.c. voltage from said third d.c. voltage and for supplying a measuring signal having a value depending on said magnitude of said current;
means for producing a first reference signal with a first value and a second value in response respectively to a first and a second state of a control signal, said first value being equal to said value of said measuring signal when said magnitude of said current is substantially equal to said constant magnitude, and said second value being equal to a fraction of said first value of said first reference signal;
means for supplying an integration signal having a value equal to an integral in dependence of time of the difference between one of said first and second values of said first reference signal and said value of said measuring signal; and
means responsive to said first state of said control signal for producing said regulation signal with a value equal to the value of said integration signal when said second d.c. voltage across the group terminals of each group of said multiple groups of cells is less than said reference voltage and with a value equal to a value of a second reference signal when said second d.c. voltage across the group terminals of any group of said multiple groups of cells is greater than said reference voltage, and responsive to said second state of said control signal for producing said regulation signal with a value equal to said value of said integration signal independently of said second d.c. voltage across the group terminals of each group of said multiple groups of cells;
and wherein said apparatus further comprises means responsive to said second state of said control signal for applying said first d.c. voltage to said inputs of said regulator means.

5. An apparatus according to claim 1, wherein each group of said multiple groups of cells comprises more than one cell.

* * * * *